(12) United States Patent
Ma

(10) Patent No.: US 12,237,093 B2
(45) Date of Patent: Feb. 25, 2025

(54) INTEGRATED X-RAY OPTICS DESIGN

(71) Applicant: The Regents of the University of California, Oakland, CA (US)

(72) Inventor: Yanbao Ma, Merced, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 327 days.

(21) Appl. No.: 17/784,103

(22) PCT Filed: Dec. 10, 2020

(86) PCT No.: PCT/US2020/064335
§ 371 (c)(1),
(2) Date: Jun. 9, 2022

(87) PCT Pub. No.: WO2021/119331
PCT Pub. Date: Jun. 17, 2021

(65) Prior Publication Data
US 2023/0019952 A1    Jan. 19, 2023

Related U.S. Application Data

(60) Provisional application No. 62/947,499, filed on Dec. 12, 2019.

(51) Int. Cl.
*C01B 32/25* (2017.01)
*G21K 1/06* (2006.01)

(52) U.S. Cl.
CPC ............... *G21K 1/06* (2013.01); *C01B 32/25* (2017.08)

(58) Field of Classification Search
CPC ............... G21K 1/06; G21K 2201/062; G21K 2201/067; C01B 32/25; B01J 19/088
See application file for complete search history.

(56) References Cited

U.S. PATENT DOCUMENTS

| | | | |
|---|---|---|---|
| 10,269,528 B2 * | 4/2019 | Yun ........................ | H01J 35/10 |
| 10,295,485 B2 * | 5/2019 | Yun ....................... | G01N 23/087 |
| 10,416,099 B2 * | 9/2019 | Yun ........................ | H01J 35/08 |
| 2006/0060390 A1 | 3/2006 | Eyre | |

(Continued)

OTHER PUBLICATIONS

Stoupin S, et al. All-diamond optical assemblies for a beam-multiplexing X-ray monochromator at the Linac Coherent Light Source. J Appl Crystallogr. Aug. 1, 2014;47(Pt 4):1329-1336. doi: 10.1107/S1600576714013028. PMID: 25242912; PMCID: PMC4119950. (Year: 2014).*

(Continued)

*Primary Examiner* — David E Smith
*Assistant Examiner* — Christopher J Gassen
(74) *Attorney, Agent, or Firm* — SCHWEGMAN LUNDBERG & WOESSNER P.A.

(57) ABSTRACT

Systems and methods of providing X-ray optics are described. The optics are formed from CVD thin film diamond. The optics lave three sections that include a tip on which X-rays impinge, a base, and an intermediate section connecting the base and the tip. The intermediate section tapers from the base to the tip. The base has a substantially larger thickness than the tip. The base is disposed within a holder that securely retains the optics to provide vibration control, while the tip is thin enough to provide thermal management and reduce crystal strain.

17 Claims, 11 Drawing Sheets

(56) References Cited

U.S. PATENT DOCUMENTS

| | | | |
|---|---|---|---|
| 2015/0092924 A1* | 4/2015 | Yun | H01J 35/105 378/143 |
| 2015/0092925 A1* | 4/2015 | Stoupin | G01T 1/26 378/145 |
| 2015/0110252 A1* | 4/2015 | Yun | H01J 35/147 378/138 |
| 2015/0194287 A1* | 7/2015 | Yun | H01J 35/12 378/138 |
| 2015/0247811 A1* | 9/2015 | Yun | G01N 23/2076 378/45 |
| 2015/0303022 A1 | 10/2015 | Yamada et al. | |
| 2015/0311026 A1 | 10/2015 | Tsukamoto et al. | |
| 2016/0178540 A1* | 6/2016 | Yun | G01N 23/205 378/83 |
| 2016/0268094 A1* | 9/2016 | Yun | H01J 35/147 |
| 2017/0085055 A1* | 3/2017 | Shu | G21K 1/06 |
| 2017/0162288 A1* | 6/2017 | Yun | G21K 1/06 |
| 2018/0356343 A1 | 12/2018 | Neuman et al. | |

OTHER PUBLICATIONS

International Application Serial No. PCT/US2020/064335, International Search Report mailed Mar. 12, 2021, 2 pgs.

International Application Serial No. PCT/US2020/064335, Written Opinion mailed Mar. 12, 2021, 4 pgs.

International Application Serial No. PCT/US2020/064335, International Preliminary Report on Patentability mailed Jun. 23, 2022, 6 pgs.

\* cited by examiner

INTEGRATED X-RAY OPTICS DESIGN

CLAIM OF PRIORITY

This application is a U.S. National Stage Filing under 35 U.S.C. 371 from International Application No. PCT/US2020/064335, filed on Dec. 10, 2020, and published as WO 2021/119331 A1 on Jun. 17, 2021, which claims the benefit of priority to U.S. Patent Application Ser. No. 62/947,499, filed on Dec. 12, 2019, each of which is incorporated by reference herein in its entirety.

TECHNICAL FIELD

Embodiments pertain to measurement of materials using X-rays. Some embodiments relate to methods and mechanisms for mounting and stabilizing materials for obtaining x-ray measurements.

BACKGROUND

A number of disparate tools have been developed to help determine characteristics of various electronic and biological materials. One such class of devices and systems include the use of light sources (lasers) of various wavelengths, depending on the material and characteristics, to measure a material or device under test (hereinafter merely referred to as "test material"). One such example of a laser-based tool is an X-ray free-electron laser light source used for cutting-edge scientific investigations and engineering applications in various areas such as atomic, molecular, and optical physics; condensed matter physics; matter in extreme conditions: chemistry and soft matter, biology, crystallography, tomography, and non-destructive material and device testing.

X-rays, in particular, among laser tools are problematic as absorption of X-rays by optics used to provide the X-rays to the test material. Such absorption can significantly affect the optical performance of the optics. Moreover, both thermal management and vibrational control of the optics are mechanical design elements to be considered to stabilize the performance of X-ray optics.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1A:
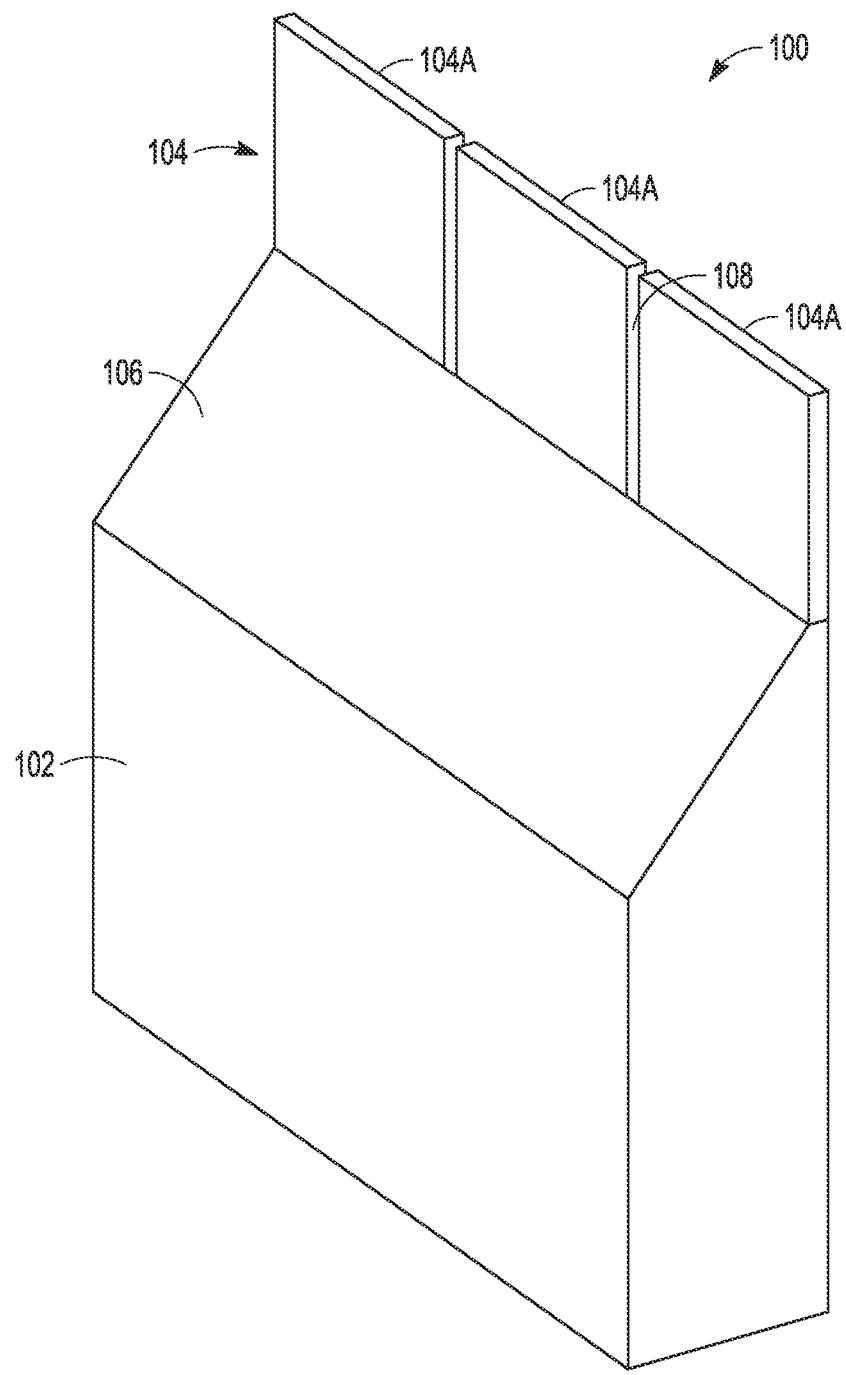
FIG. 1A illustrates a perspective view of a diamond thin film in accordance with some embodiments.

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

As discussed above, thermal management and vibrational control of optics used to deliver X-rays to a test material is desirable. In particular, thermal loading effects on crystal monochromators used to select a defined wavelength of a source through diffraction and Bragg mirrors used to reflect the defined wavelength are becoming a bottleneck for the next-generation of high-brightness, high-repetition-rate, coherent hard X-ray light sources. Such X-ray light sources may include a self-seeded free electron laser (FEL) and an X-ray free electron laser oscillator (XFELO).

Diamond crystals are widely used for high-brightness XFEL optics due to a unique combination of superb thermal, mechanical, and optical properties. Diamond optics operating at cryogenically cooled conditions are especially favorable thanks to the thermal conductivity and small coefficient of thermal expansion for temperatures $T \leq 100K$. Consequently, cryocooling may provide a general solution to alleviating or even eliminating thermal loading effects on X-ray optics.

One manner of providing such optics for a hard X-ray self-seeding monochromator is through the use of a diamond crystal sliding fit holder. Such a holder may be made of pyrolytic graphite on which a slot is cut, and a thin film diamond crystal slid in the graphite slot to avoid strain from mechanical mounting. However, this design suffers from an inability to provide a sufficient amount of heat transfer at an interface between the graphite slot and the thin film diamond crystal due to a high thermal interface impedance of the contact.

Another manner of providing the X-ray optics is to use a diamond device for X-ray self-seeding monochromator in which a metal clamping holder is used to reduce thermal interface impedance of the diamond thin film. In the diamond device, a group of two diamond thin films sandwich an active diamond thin film, while another diamond thin film below the group of diamond thin films and active diamond thin film is used as a spacer as part of the clamping apparatus. Two cuts are made on the diamond device to obtain 'deformation-free clamping', while perhaps decreasing deformation of the optics concurrently almost doubling the thermal impedance.

Such structures (e.g., the diamond crystal sliding fit holder or diamond device) serve to illustrate tradeoffs on the retention of diamond thin films. That is, the conflicting requirements for thermal design and mechanical design for the holder of thin-film diamond x-ray optics are that of hard contact to reduce thermal interface impedance while soft contact to minimize crystal strain from mechanical mounting. The former design in which the diamond thin film is slid into the graphite holder does not provide sufficient heat transfer at the interface due to high thermal interface impedance cause by the soft contact, while metal clamping of the diamond device in the latter design can provide efficient heat transfer at the cost of introducing cuts in the diamond device to reduce crystal strain that about doubles the thermal impedance of the diamond device. In addition, while relatively large-sized optics rely on convective cooling to stabilize the optical performance of diamond x-ray optics, the above designs are incompatible with convective cooling due to the small size of the holder.

Figure 1B:
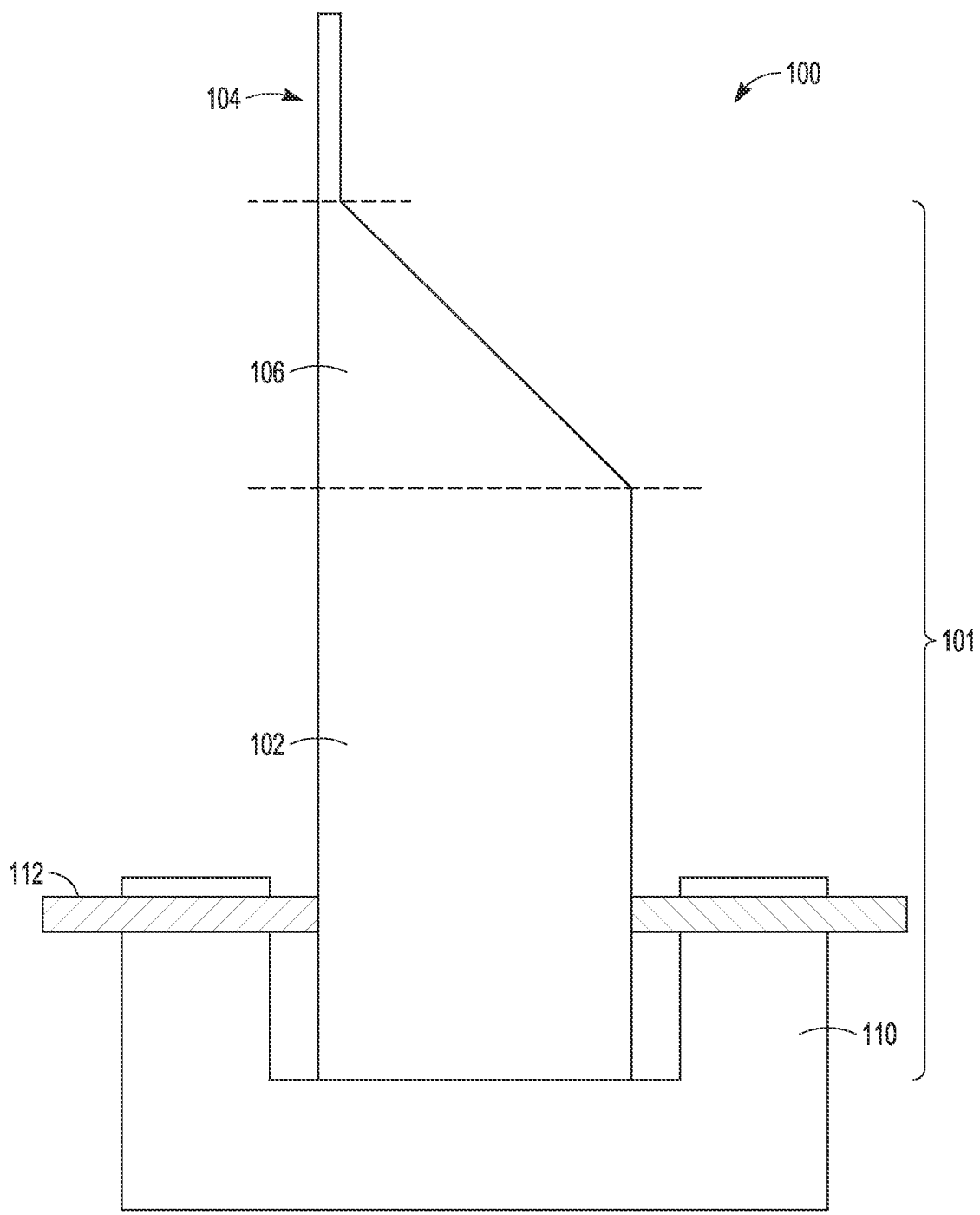
FIG. 1B illustrates a cross-sectional view of the diamond thin film of FIG. 1A in accordance with some embodiments.
Figure 1C:
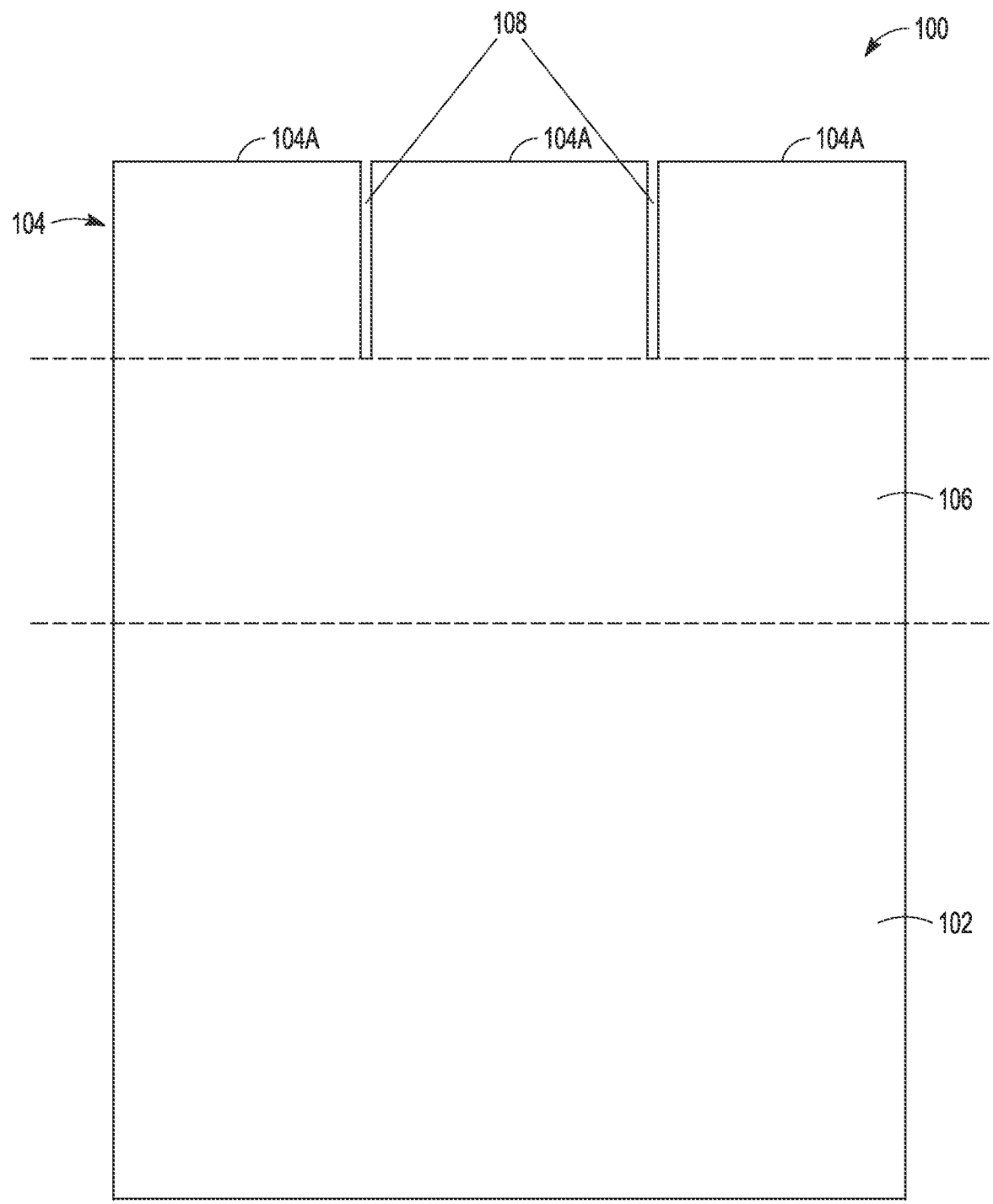
FIG. 1C illustrates a front view of the diamond thin film of FIG. 1A in accordance with some embodiments.
Figure 1D:
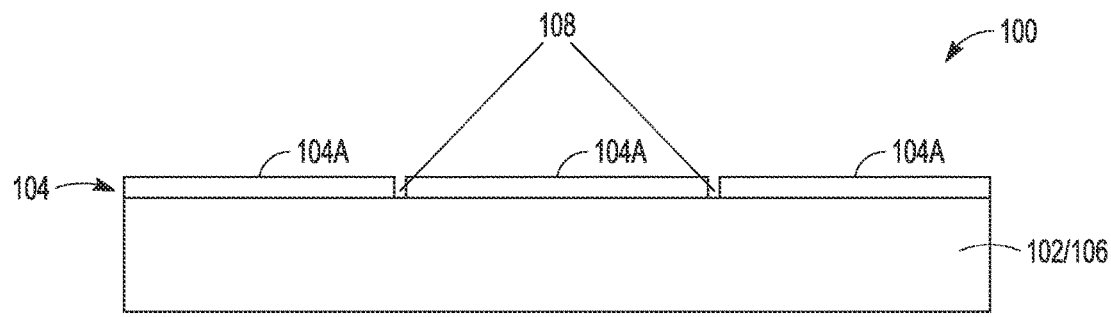
FIG. 1D illustrates a top view of the diamond thin film of FIG. 1A in accordance with some embodiments.

Accordingly, an integrated thermomechanical design of x-ray optics with optimized thermal management and vibration control is provided herein. FIGS. 1A-1D illustrate various views of a diamond thin film in accordance with some embodiments. Specifically, FIG. 1A illustrates a perspective view of the diamond thin film: FIG. 1B illustrates a cross-sectional view of the diamond thin film: FIG. 1C illustrates a front view of the diamond thin film; and FIG. 1D illustrates a top view of the diamond thin film.

The diamond thin film 100 may be formed using chemical vapor deposition (CVD) or other manufacturing method and may be subsequently processed to form the desired shape. The diamond thin film 100 may contain different integrally-formed sections. These sections may include a tip 104 and a tapered base 101 that comprises a base 102 and an intermediate section 106.

The portion of the diamond thin film (tip) 104 used as X-ray optics (X-ray diffraction), which may have a thickness in the range from about 30 microns to about 250 microns. The tip 104 may have a substantially rectangular cross-sectional shape. The tip 104 may have one or more partitions 108 extending substantially therethrough such that the tip 104 is composed of discrete segments 104a. In some embodiments, the height of the discrete segments 104a may be about 100 to about 1000 microns in vertical direction, while the width is about 500 to about 10000 microns.

A base 102, similarly, may have a substantially rectangular cross-sectional shape. The thickness of the base 102 may be about 1 mm (again within about 10%). The base 102 provides a strong interface material to minimize thermal interface impedance and crystal strain from a mounting apparatus (not shown) to which the diamond thin film 100 is attached. That is a mechanical mounting or clamping apparatus may be applied to the base 102.

An intermediate section 106, in some embodiments, may have a substantially triangular cross-sectional shape. In particular, the cross-section of the intermediate section 106 may be a frustrated triangle in which a base of the triangle has the same thickness as the base 102 and a top of the triangle has the same thickness as the tip 104. The intermediate section 106 connects the tip 104 with the base 102 such that the backside of the intermediate section 106 is substantially planar with the backside of the tip 104 and with the backside of the base 102, while the front of the intermediate section 106 tapers from being planar with a frontside of the base 102 to being planar with the tip 104. Note that the term "substantially" as used herein excludes uncontrolled variations in characteristics; for example, substantially planar excludes variations in the surface caused by inadvertent variations in the crystal or planarization process. In some embodiments, the taper of the intermediate section 106 may be continuous. In one embodiment, the height of the intermediate section 106 is larger than the tip 104 but smaller than the base 102.

Figure 4:
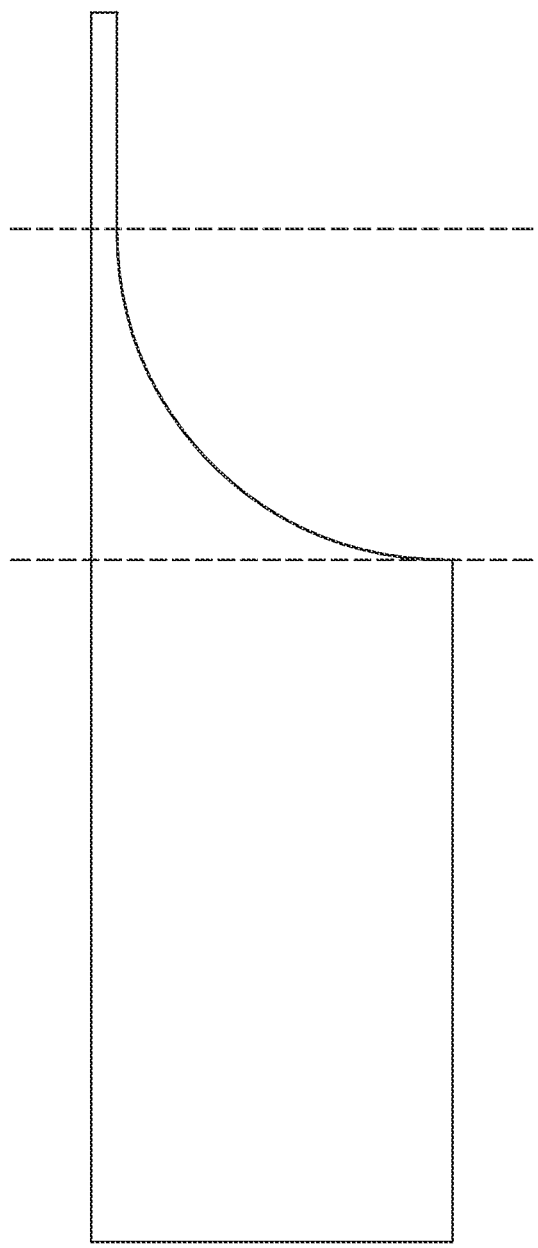
FIG. 4 illustrates a cross-sectional view of another embodiment of a diamond thin film.
Figure 5:
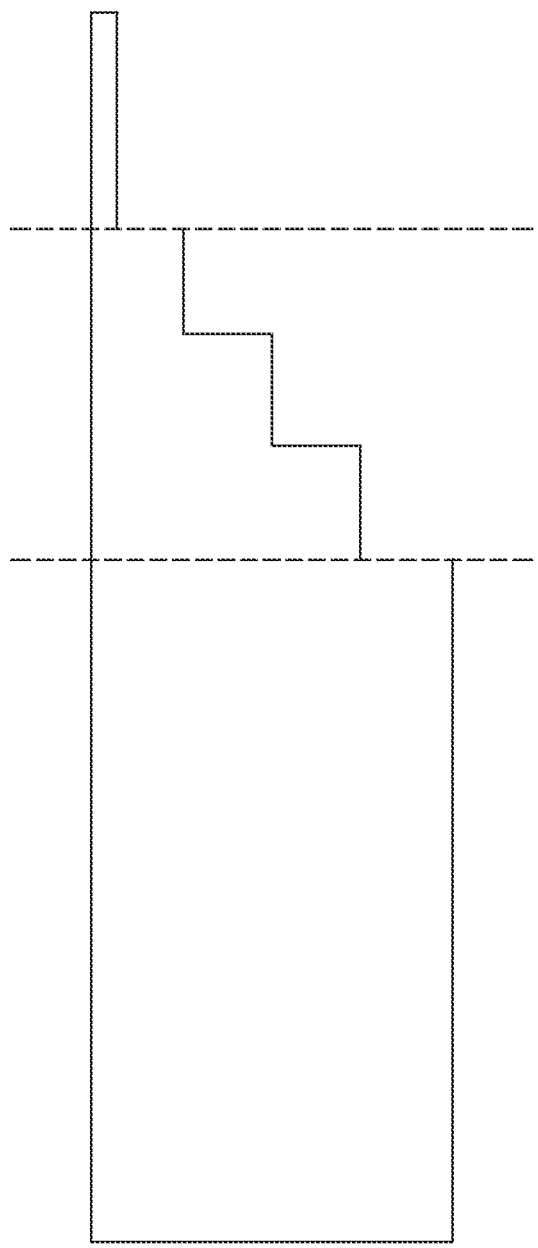
FIG. 5 illustrates a cross-sectional view of another embodiment of a diamond thin film.
Figure 6:
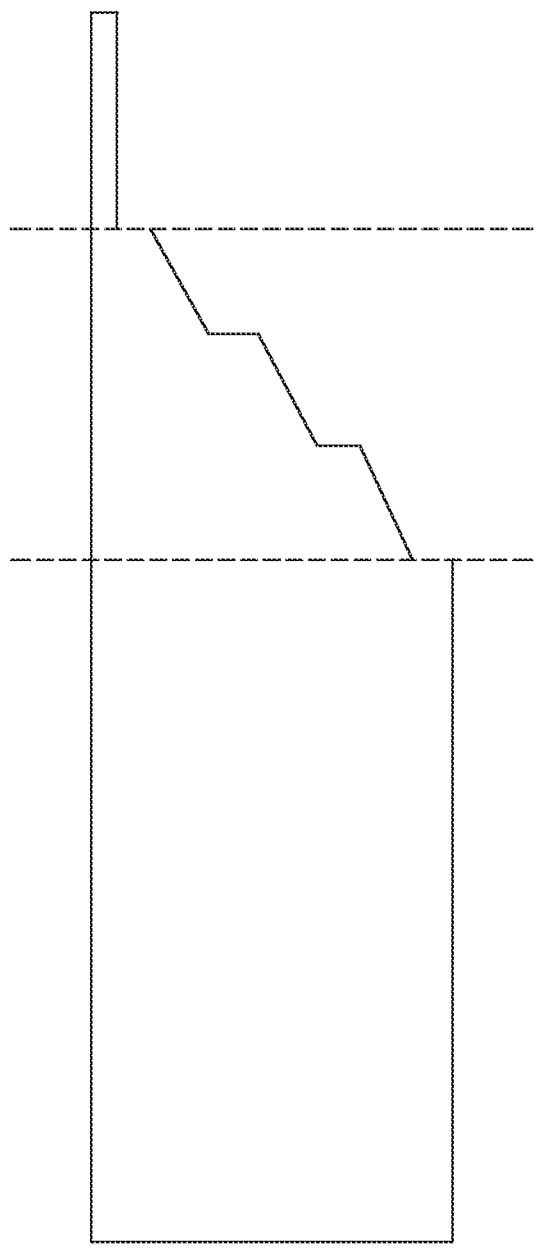
FIG. 6 illustrates a cross-sectional view of another embodiment of a diamond thin film.

In some embodiments, the taper may be continuous but may not be linear, for example being curved, as shown in FIG. 4. In other embodiments, as shown in FIGS. 5 and 6, the taper of the intermediate section 106 may not be continuous, the intermediate section 106 may have a cross-sectional shape that differs from a substantially triangular shape. For example, the intermediate section 106 may have a stair-step shape with discrete portions that extend essentially parallel to the backside of the base 102 and tip 106, each portion having a different constant thickness as shown in FIG. 5. As shown, the height of the different portions and the thickness difference between adjacent portions may be the same. In some embodiments, the height of at least one portion may be different from the height of at least one other portion and/or the thickness difference between at least one pair of adjacent portions may be different from the thickness difference between at least one other pair of adjacent portions.

In some embodiments, each portion may have a continuous linear taper (as shown in FIG. 6) or non-linear taper, with discrete jumps of equal or unequal size between the end of one portion and the beginning of the next portion. In the former case, each portion may have a substantially trapezoidal cross-sectional shape. As discussed above, the taper (slope)/curvature of the different portions and the thickness difference between ends of adjacent portions may be the same. In some embodiments, the taper/curvature of at least one portion may be different from the taper/curvature of at least one other portion and/or the thickness difference between ends of at least one pair of adjacent portions may be different from the thickness difference between the ends of at least one other pair of adjacent portions.

The structure shown in FIGS. 1A-ID thus provides a method and integrated thermomechanical design of X-ray optics with optimized thermal management, minimized crystal strain, and vibration control. The integrated thermomechanical design provides a tapered base for the thin-film CVD diamond optics. The strong material strength and low thermal conductivity of the thick base can provide optimal solutions to thermal management, minimized crystal strain, and vibration control. The structure may also be compatible with active cooling when the structure is connected with a heat sink with active cooling (e.g., the use of liquid $N_2$ or other low-temperature material supplied to the heat sink).

The thick base 102 (compared to the thickness of the tip 106) can significantly reduce thermal impedance and enhance heat dissipation inside the diamond device. Meanwhile, the superior material strength of diamond in the base 102 can handle mechanical clamping to minimize both thermal interface impedance and crystal strain in the tip areas caused by deformation.

The base 102 of the diamond thin film 100 may be disposed, as shown in FIG. 1B, in a mounting apparatus, such as a holder 110 shown in FIG. 1B. The holder 110 may have a recess and retaining fasteners 112 that extend into the recess. The retaining fasteners 112 may be screws, electromagnetic clamps, or other devices used to retain the diamond thin film 100 therein. The retaining fasteners 112 may be formed from a conductive material, such as metal or another material. The bottom of the base 102 may contact a top surface of the holder 110 in the recess. The force applied to the base 102 of the diamond thin film 100 may be controlled up to a predetermined level, such as that for coherence preservation hard X-ray optics applications.

In some embodiments, the dimensions of the base 102 may be 1×4×2 mm, the dimensions of the intermediate section 106 may be 1×4×1 mm the dimensions of the tip 104 may be 0.1×4×1 mm.

Figure 2A:
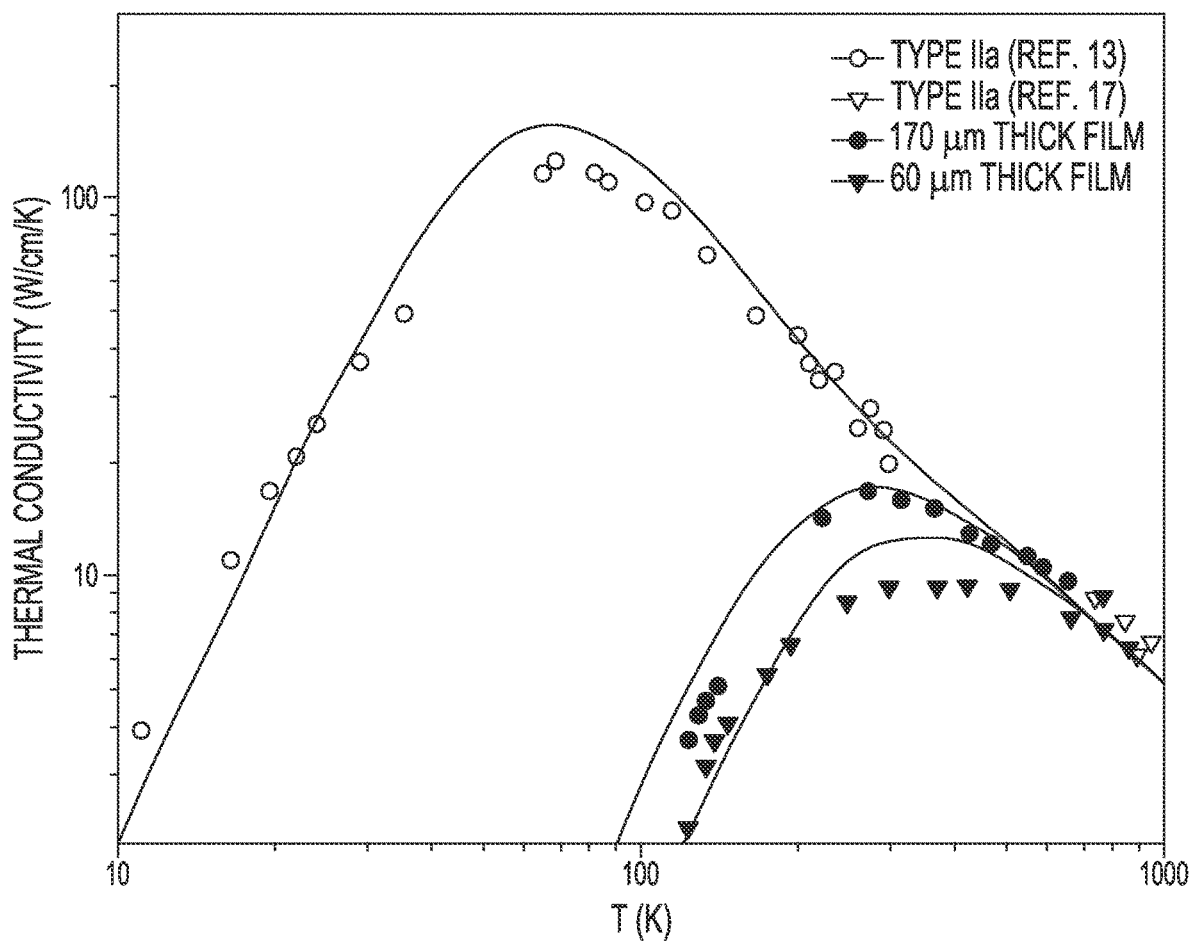
FIG. 2A illustrates thermal conductivity of bulk diamond and diamond thin films at different temperatures in accordance with some embodiments.

Experiments on CVD diamond show that there is thickness-dependent thermal conductivity in diamond thin films at cryogenic temperatures. FIG. 2A illustrates thermal conductivity of bulk diamond and diamond thin films at different temperatures in accordance with some embodiments. For single crystal, thermal conductivity reaches a peak value~10,000 W/mK around 70K. Therefore, cryocooling may increase thermal conductivity until the temperature reaches about 70K. This allows cryocooling to take advantage of high thermal conductivity for heat dissipation. At room temperature, the measured thermal conductivity of a CVD diamond 170 μm thick film is close to the bulk value of natural single crystal diamond, which indicates the high quality of the CVD diamond film and reliable measurement methods. At room temperature, the measured thermal conductivity of the 60 μm thick film, is significantly lower than the value for a single diamond crystal. At 100K, the thermal conductivity of the 170 μm thick film drops less than 5% of its bulk value and drops further for the 60 μm thick film. Similar results are also shown on CVD diamond thin films. For example, the measured thermal conductivity of the 300 μm thick film drops to about 20% if its bulk value is at 100K.

Figure 2B:
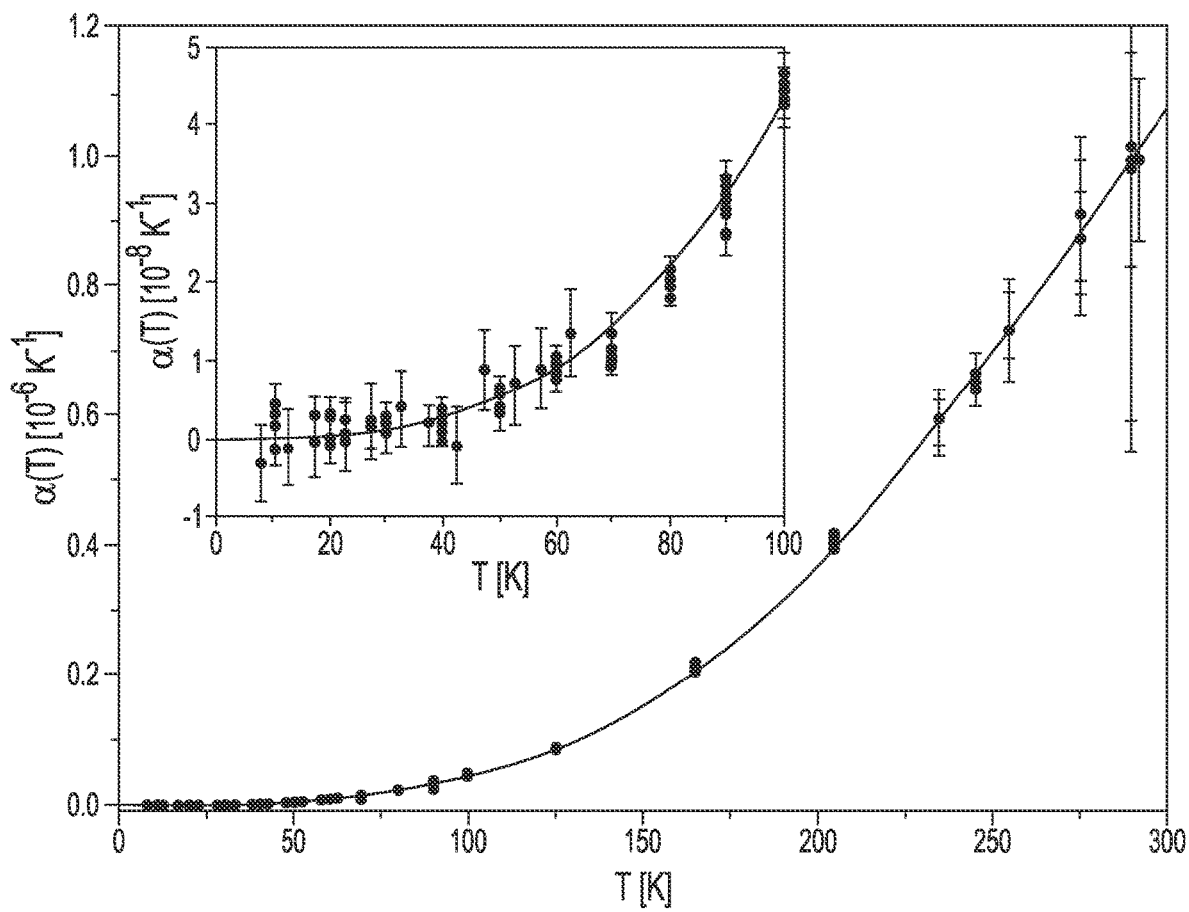
FIG. 2B illustrates a coefficient of thermal expansion for diamond material at different temperatures in accordance with some embodiments.

FIG. 2B illustrates a coefficient of thermal expansion for diamond material at different temperatures in accordance with some embodiments. Thermal loading effects result from thermal expansion which can be estimated as the product of thermal expansion coefficient $\alpha(T)$ and temperature change ($\Delta T$), i.e., $a\Delta T$. Except for thermal conductivity, using cryocooling to reduce thermal loading effects may also take the advantage of the extremely small coefficient of thermal expansion of diamond thin films at cryogenic temperature. Ultraprecise measurements of the thermal expansion coefficient of diamond using backscattering X-ray diffraction are shown in FIG. 2B, and the results can fit to the Debye T3 approximation [$\alpha(T)=4.25\times10-14T3$]. Based on this approximation, thermal expansion coefficient of diamond increases about 27 times when temperature increases from 100K to 300K.

Based on the above, the tapered design with thick base can significantly reduce thermal impedance due to much higher thermal conductivity in bulk material compared to that in thin film. Meanwhile, cryogenic cooling may be used to take advantage of extremely low coefficient of thermal expansion at low temperatures. The tapered design with a larger holder is compatible with a heat sink used for convective cooling.

Figure 3:
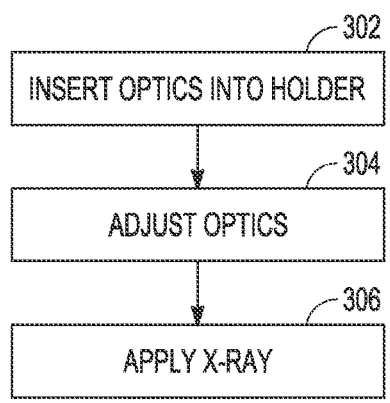
FIG. 3 illustrates a method of operation of the diamond film in accordance with some embodiments.

FIG. 3 illustrates a method of operation of the structure shown in the structures described herein in accordance with some embodiments. Although only some operations are shown in FIG. 3, other steps may be present in various embodiments. At operation 302, the optics shown in FIGS. 1A-1D may be inserted into the holder. The bottom of the base of the optics may be inserted in a recess of the holder to be in contact with a top surface of the holder within the recess.

At operation 304, the optics may be adjusted within the holder. For example, the optics may be adjusted to be centered within the recess. After insertion of the optics into the recess, fasteners within the recess may be used to retain the optics securely without damaging the optics. The position of the optics may also be adjusted to be aligned to provide the desired optical characteristics. The temperature of the optics may also be adjusted. For example, the optics may be cryocooled to a temperature at or below about 100K. The position and/or temperature may be controlled electronically via Bluetooth, WiFi, or any other radio access technology built into or attached to the holder. The X-ray may be applied to the optics at operation 306.

Figure 7:
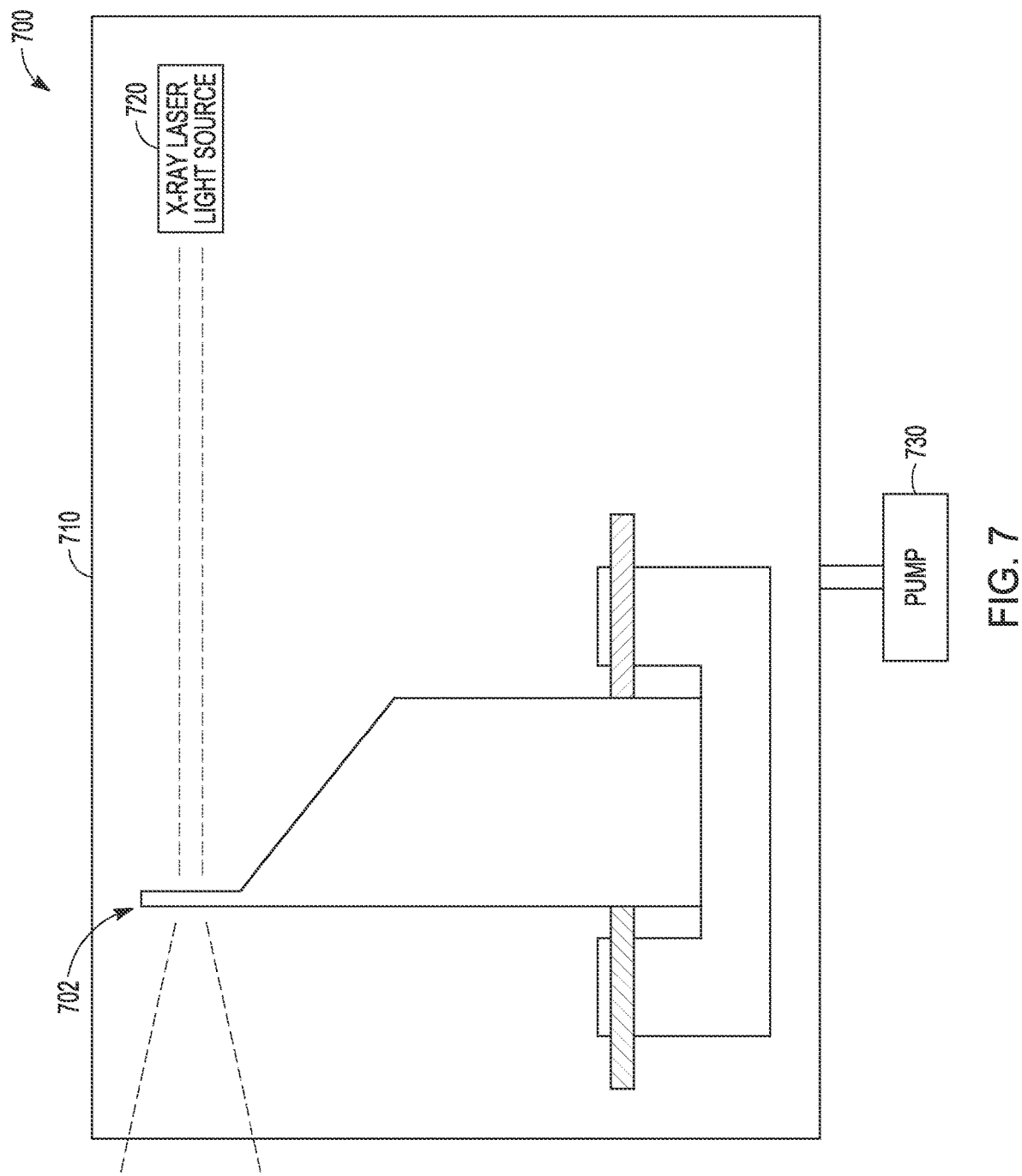
FIG. 7 illustrates a system using a diamond thin film in accordance with some embodiments.

FIG. 7 illustrates a system using a diamond thin film in accordance with some embodiments. Other elements may be present in the system but are not shown for convenience. The system 700, as shown in FIG. 7, may include a diamond thin film 702 contained within a chamber 710. Although the cross-sectional area of the diamond thin film 702 is shown in FIG. 7, the diamond thin film 702 may have any of the cross-sections shown or described herein.

The chamber 710 may allow evacuation to remove particulates within the chamber 710. In some embodiments, the chamber 710 may be, for example, a cryo-chamber that is used to reduce the temperature to any of the ranges described hereinto, such as 100K or below. A pump 730 may be used to reduce the temperature of elements within the chamber 710. The chamber 710 may in some embodiments use liquid nitrogen or another refrigerant. In other embodiments, the diamond thin film 702 may be retained at room temperature and the chamber 710 may be merely evacuated rather than evacuated and cooled.

The diamond thin film 702 is disposed within the chamber 710 and positioned such that an X-ray laser beam 722 from an X-ray laser light source 720 impinges thereupon. The X-ray laser light source 720 may be located within the chamber 710 as shown or may be outside of the chamber 710. The chamber 710 may be the container for an X-ray laser, such as an X-ray free electron laser (XFEL), for example, in which the diamond thin film 702 provides the X-ray optics. In some embodiments, the diamond thin film 702 may be used to create self-seeding hard XFEL optics, hard X-ray free-electron laser oscillators (XFELO), X-Ray Regenerative Amplifier Free-Electron Laser (RAFEL), or X-ray optics for high-brightness coherent X-ray sources.

Figure 8:
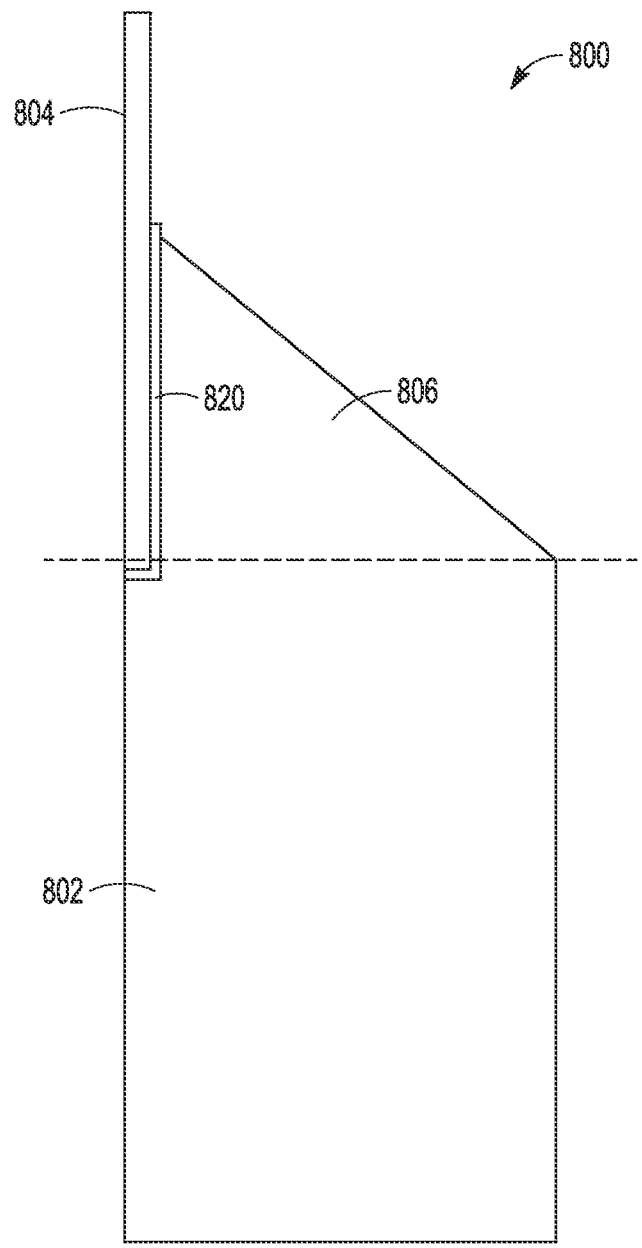
FIG. 8 illustrates a cross-sectional view of a diamond thin film structure in accordance with some embodiments.

FIG. 8 illustrates a cross-sectional view of a diamond thin film structure in accordance with some embodiments. The structure is similar to that shown in the embodiments above. Thus, the diamond thin film (tip) 804 may be composed of discrete segments. The tip 804 may have a substantially rectangular cross-sectional shape. The structure may further have a base 802 with a substantially rectangular cross-sectional shape and an intermediate section 806 with a substantially triangular cross-sectional shape. The dimensions of the base 802, tip 804 and intermediate section 806 may be similar to those above.

However, rather than being integral with the base 802 and the intermediate section 806, the tip 804 in the structure of FIG. 8 is separate from the base 802 and the intermediate section 806. That is, the tip 804 may be attached to only one side of the intermediate section 806 using a composite solder 820 or other similar adhesive that does not interfere with the functionality of the tip 804 described herein. Although not shown in FIG. 8, the tip 804 may also be attached to the base 802 using the composite solder 820. The base 802 and intermediate section 806 may be an integral structure that is formed from diamond or one or more other materials with high thermal conductivity, that is, similar to diamond. In FIG. 8, the thickness of the combined structure of the tip 804 and the intermediate section 806 at a base of the intermediate section 806 (where the intermediate section 806 and the base 802 are adjoined) along a plane parallel to the bottom of the base 802 is the same as the thickness of the base 802 (i.e., the thickness of the intermediate section 806 is less than that of the base 802) for compactness, for example. In other embodiments, for ease of manufacturability, for example, the thickness of the intermediate section 806 may be the same as that of the base 802, and the thickness of the combined structure of the tip 804 and the intermediate section 806 may be greater than that of the base 802.

Figure 9:
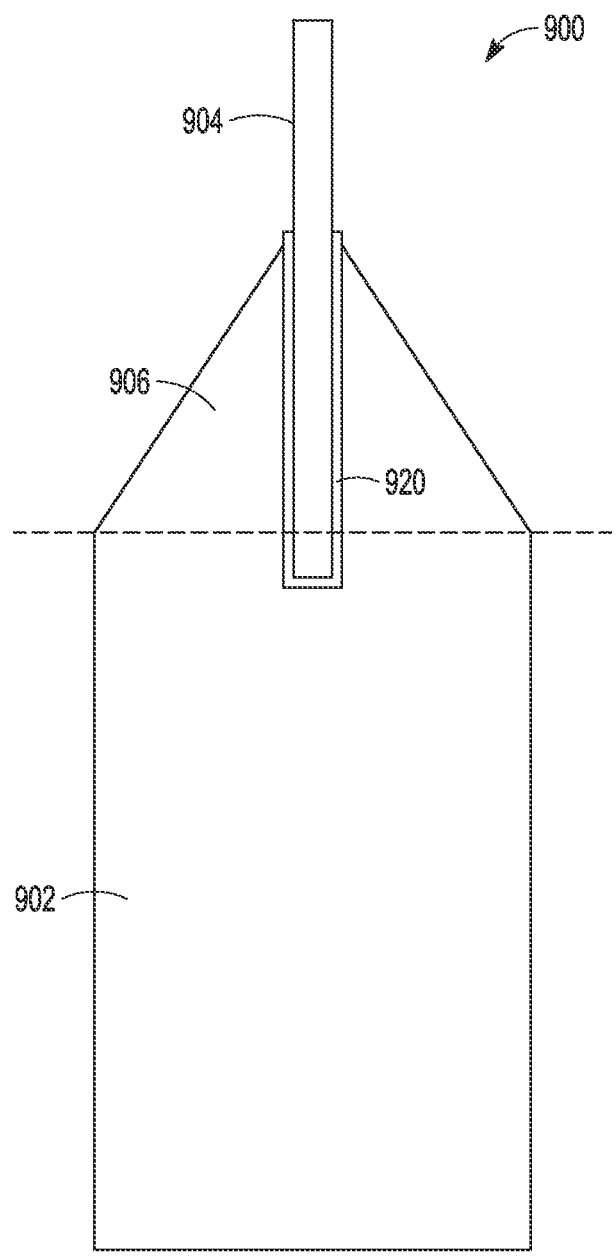
FIG. 9 illustrates a cross-sectional view of another diamond thin film structure in accordance with some embodiments.

FIG. 9 illustrates a cross-sectional view of a diamond thin film structure in accordance with some embodiments. The structure is similar to that shown in the embodiments above. Thus, the diamond tip 904 may be composed of discrete segments. The tip 904 may have a substantially rectangular cross-sectional shape. The structure may further have a base 902 with a substantially rectangular cross-sectional shape and an intermediate section 906 with a pair of substantially triangular cross-sectional shapes facing each other. The dimensions of the base 902, tip 904 and intermediate section 906 may be similar to those above.

Like the embodiment shown in FIG. 8, rather than being integral with the base 902 and the intermediate section 906, the tip 904 in the structure of FIG. 9 is separate from the base 902 and the intermediate section 906. In the embodiment of FIG. 9 the tip 904 may be disposed between both opposing triangles. That is, as shown, the tip 904 may be attached to the sides of both opposing triangles of the intermediate section 906 using a composite solder 920 or other similar adhesive to improve stability of the overall structure. The base 902 and intermediate section 906 may be an integral structure that is formed from diamond or one or more other materials with high thermal conductivity. Note that, although the tip (and composite solder) is shown in FIGS. 8 and 9 as extending into the base from the top of the intermediate section, in other embodiments, the tip and/or composite solder may terminate at or before the plane that defines the transition between the base and the intermediate section.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus comprising:
a diamond structure comprising:
a base having a first non-zero height, a first non-zero thickness, and a first non-zero width,
a tip having a second non-zero height, a second non-zero thickness, and a first non-zero width, and
an intermediate section connecting the base and the tip, the intermediate section tapering from the base to the tip, the diamond structure having dimensions suitable for x-ray optics in which the tip has dimensions configured to receive x-rays that impinge on the tip in a thickness direction of the tip.

2. The apparatus of claim 1, wherein a backside of the base, the tip, and the intermediate section are substantially planar and the first non-zero thickness is larger than the second non-zero thickness.

3. The apparatus of claim 2, wherein a frontside of the intermediate section continuously tapers from a frontside of the base to a frontside of the tip.

4. The apparatus of claim 3, wherein the frontside of the intermediate section continuously tapers linearly from the frontside of the base to the frontside of the tip.

5. The apparatus of claim 2, wherein a frontside of the intermediate section continuously tapers non-linearly from a frontside of the base to a frontside of the tip.

6. The apparatus of claim 2, wherein a frontside of the intermediate section discontinuously tapers from a frontside of the base to a frontside of the tip.

7. The apparatus of claim 6, wherein the frontside of the intermediate section discontinuously tapers linearly from the frontside of the base to the frontside of the tip.

8. The apparatus of claim 2, wherein the second non-zero thickness is about 30 microns to about 120 microns and the first non-zero thickness is about 1 mm.

9. The apparatus of claim 1, wherein the tip has at least one partition extending therethrough from a top of the tip to a bottom of the tip adjacent to the intermediate section.

10. The apparatus of claim 1, wherein a cross-section of the base and tip are substantially rectangular, and a cross-section of the intermediate section is substantially triangular.

11. The apparatus of claim 1, wherein the diamond structure is formed by chemical vapor deposition (CVD).

12. A system comprising:
a diamond structure comprising:
a base having a first non-zero height, a first non-zero thickness, and a first non-zero width,
a tip having a second non-zero thickness for x-ray optics and having a second non-zero height and a second non-zero width, and
an intermediate section connecting the base and the tip, the intermediate section tapering linearly from a frontside of the base to a frontside of the tip; and
a mounting apparatus configured to retain the base of the diamond structure therein.

13. The system of claim 12, wherein a backside of the base, the tip, and the intermediate section are substantially planar and the first non-zero thickness is larger than the second non-zero thickness.

14. The system of claim 12, wherein the second non-zero thickness is about 30 microns to about 120 microns and the first non-zero thickness is about 1 mm.

15. The system of claim 12, wherein the tip has at least one partition extending therethrough from a top of the tip to a bottom of the tip adjacent to the intermediate section.

16. The system of claim 12, wherein a cross-section of the base and tip are substantially rectangular, and a cross-section of the intermediate section is substantially triangular.

17. The system of claim 12, wherein the mounting apparatus comprises retaining fasteners configured to retain the base therein.

\* \* \* \* \*